(12) United States Patent
Imana et al.

(10) Patent No.: US 9,825,653 B2
(45) Date of Patent: Nov. 21, 2017

(54) COGNITIVE RECONFIGURABLE RF TECHNOLOGY

(71) Applicants: Eyosias Yoseph Imana, Blacksburg, VA (US); Tae Young Yang, Blacksburg, VA (US); Jeffrey H. Reed, Blacksburg, VA (US)

(72) Inventors: Eyosias Yoseph Imana, Blacksburg, VA (US); Tae Young Yang, Blacksburg, VA (US); Jeffrey H. Reed, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 224 days.

(21) Appl. No.: 14/835,285

(22) Filed: Aug. 25, 2015

(65) Prior Publication Data

US 2016/0057637 A1    Feb. 25, 2016

Related U.S. Application Data

(60) Provisional application No. 62/041,268, filed on Aug. 25, 2014.

(51) Int. Cl.
*H04W 24/02* (2009.01)
*H04B 1/00* (2006.01)

(52) U.S. Cl.
CPC .................. *H04B 1/001* (2013.01)

(58) Field of Classification Search
None
See application file for complete search history.

(56) References Cited

U.S. PATENT DOCUMENTS

| | | | | |
|---|---|---|---|---|
| 2007/0091998 A1* | 4/2007 | Woo | ........................ | H04B 1/406 375/240.02 |
| 2008/0214130 A1* | 9/2008 | Park | ........................ | H04W 8/005 455/161.3 |
| 2011/0151798 A1* | 6/2011 | Kim | ..................... | H04L 27/0006 455/67.11 |
| 2011/0255448 A1* | 10/2011 | Hartman | ............. | H04L 27/0006 370/277 |
| 2012/0135675 A1* | 5/2012 | Kim | ..................... | H04L 27/0006 455/1 |
| 2014/0177484 A1* | 6/2014 | Balijapalli | ............ | H04W 16/14 370/280 |
| 2015/0057041 A1* | 2/2015 | Bao | ........................ | H04W 48/16 455/515 |
| 2016/0037505 A1* | 2/2016 | Cooklev | ............... | H04W 84/20 370/329 |

* cited by examiner

*Primary Examiner* — Duc Duong
(74) *Attorney, Agent, or Firm* — VOGT IP

(57) ABSTRACT

The present invention provides a radio architecture that contains a main radio path and a sensing path. The parameters of the main radio path are controlled by a cognitive engine. The main radio path is tuned to a desired frequency band. The sensing path is used to monitor the spectrum around the desired frequency band. To minimize effects of undesired non-linearity on sensing, sensing path may have a lower gain setting. The cognitive engine determines the optimal setting of the main RF front-end with respect to the current state of the spectrum.

20 Claims, 9 Drawing Sheets

COGNITIVE RECONFIGURABLE RF TECHNOLOGY

RELATED APPLICATIONS

This application claims the benefit of U.S. Provisional Application No. 62/041,268 filed Aug. 25, 2014 and herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

There is an increasingly dependence on wireless devices. Upcoming wireless technologies are only going to increase the dependency. In the coming years, not only will cellphones and laptops be wireless, but also cars, houses, appliances such as coffee machines, and even our body organs and almost anything may be wireless enabled. The Internet of everything (IoE) is gasping to seamlessly network us with the physical world.

The expansion of wireless use is expected to fundamentally change the way we live, work and play. However, various engineering challenges need to be tackled before this opportunity could be exploited. The future wireless devices should handle a deregulated and much more energetic spectrum. In addition, to service diverse applications scenarios, wireless devices will be desired to be software-defined and omni-functional. That is, the user should be able to significantly alter the functionality of his/her device at a click of a button, without interfering with other wireless operations.

A Software-defined radio (SDR) implements most of its functionalities using software running on a generic hardware (Mitola, Software radios-survey, critical evaluation and future directions, 1993). Because it is simpler to design, implement and maintain, SDR is supposedly cheaper compared to a hardware extensive radio. Furthermore, SDR allows radio devices to be used in a manner similar to that of personal computers where the user buys generalized hardware and installs the appropriate software to obtain the operation desired. Such scale of flexibility inspires end-user's innovation, which is vital to maintain the growth of the wireless industry in the $21^{st}$ century.

When a SDR is capable to autonomously select its parameters, it is called cognitive radio (CR) (Mitola, Cognitive Radio: An Integrated Agent Architecture for Software Defined Radio, 2000). A CR uses artificial intelligence (AI) to dynamically control its parameters. Currently, CR is primarily being applied in dynamic spectrum access (DSA) based wireless communication systems. The DSA technology allows a secondary user to use a licensed band of the spectrum when not being used by its primary user. Compared to the current radio spectrum management, a DSA based policy requires multiple radios to share frequency bands together. This is a significant shift in spectrum management as it means radios may act as direct interferers to each other. CRs incorporate flexibility and artificial intelligence in the radio design. This allows us to share the spectrum efficiently and dynamically even when interferers exist in the designated frequency band.

In other words, SDR and CR technologies have benefits that the wireless industry cannot afford to lose. Nevertheless, SDR and CR are not widely adopted because of the difficulties involved in the design of their analog section of the hardware. This section is normally called RF front-end. Unlike the digital section, the analog section of wireless devices cannot easily become flexible. To be flexible without sacrificing its key performance measures such as selectivity, the RF front-end typically has to be physically large and complex. This is one of the main reasons why SDR and CR have not been widely implemented in mobile handsets.

Because every wireless application shares a signal medium, it is critical that each radio needs to receive only the desired signal and reject the others. The pre-selector filter, which is often placed at the input of receiver RF front-ends, plays a major role in extracting the desired signal from the overall signal that is captured from the air. However, the pre-selector filter is the part of the RF front-end which is least yielding for flexibility. Often, flexible pre-selector filters are either too big or very poorly selective.

The customary practice to address this problem has been to provide solutions, which make flexible pre-selector filters small and selective.

BRIEF SUMMARY OF THE INVENTION

In one embodiment, the present invention provides small-sized flexible RF front-ends that achieves selectivity without using highly selective RF filters.

The other approach focuses on the linearity of the radio rather than on selectivity. Theoretically, it can be shown that selectivity will not be an issue if the RF front-end was purely linear. Accordingly, the second approach starts by assuming that tunable RF filters are not selective and resorts to seek for techniques, which can improve the linearity of the RF front-end. In other embodiments, the present invention provides a multi-band spectrum sensing mechanism that has enhanced performance in the presence of receiver impairments. This mechanism is developed using a new receiver modeling technique called Channelized Spectrum Representation (CSR). The CSR model may be used to design a multi-band spectrum sensing mechanism with a focus on addressing the effects of I/Q imbalance and aliasing on multi-band sensing.

In still further embodiments, the present invention provides a mechanism that can significantly enhance the opportunity detection probability of cognitive radios for emerging spectrum-sharing applications. In addition, the proposed mechanism can be integrated in to non-cognitive radio based wireless standards. For example, the medium-access control (MAC) layer of carrier-sensing-multiple-access (CSMA) based standards, such as Zigbee and WiFi, can be augmented using the proposed mechanism in order to enhance the opportunistic spectrum detection performance.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Figure 1:
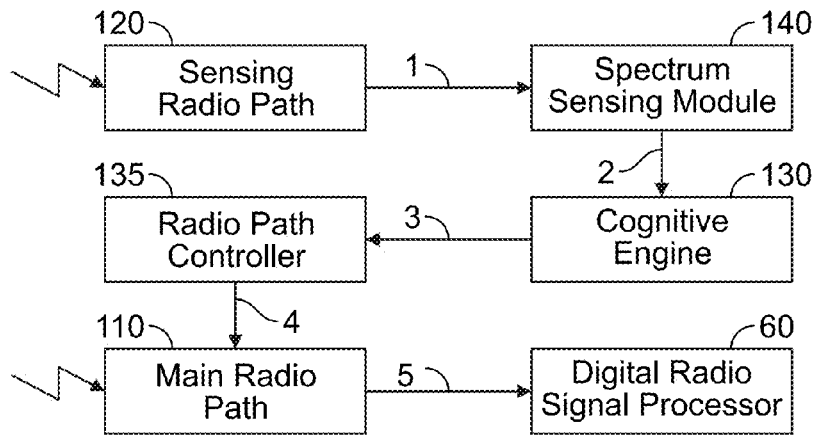
FIG. 1 provides architecture for one embodiment of the present invention.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

There are various types of tunable RF filter technologies. Generally, tunable filters can be categorized as, mechanically tunable, magnetically tunable and electronically tunable filters. Mechanically tunable filters change their characteristics by changing their physical structure. The bulkiness and slow tuning speed of mechanically tunable filters makes them inapplicable for handheld mobile radio applications. From magnetically tunable filters, the YIG filter technology is a prime example. YIG filters are known to give multi-octave tuning range and low percentage bandwidth. They are used in test equipment such as spectrum analyzers. However, their power consumption is significantly greater than that of electronically tunable filters. YIG filters also have relatively large size and weight. These characteristics make YIG filters unfavorable for handheld radio applications.

The remaining choice is the use of electronically tunable filters. Electronically tunable filters are typically constructed by using variable capacitors. They generally have smaller tuning range and lower quality factor compared to mechanically and magnetically tunable filters. Nevertheless, their small size and easiness for monolithic integration makes them favorable for handheld radio applications.

There are three prevalent technologies that are used to build variable capacitors (varactors) which are presented in Table 1. These are semiconductor technology, Barium-Strontium-Titanate (BST) and microelectromechanical systems (MEMS). A sample of recently published electronically tunable filters operating between 100 MHz and 6 GHz—the frequency range in which most commercial and public safety wireless services operate. Most of the filters listed in Table 1 have relatively small size and a tuning range of about one octave.

TABLE 1

Sample small-sized pre-selector filters

| Reference | Technology | Frequency Range (GHz) | 10-dB Bandwidth (%) | Size (cm²) |
|---|---|---|---|---|
| [8] | BST | 0.49-0.79 | ≈40 | ≈20 |
| [9] | BST | 0.18-0.28 | ≈50 | ≈15 |
| [10] | BST | 0.23-0.40 | ≈25 | ≈2 |
| [11] | Semiconductor | 0.70-1.33 | ≈30 | ≈10 |
| [12] | MEMS | 1.50-2.50 | ≈12 | ≈0.5 |
| [13] | Semiconductor | 0.50-0.90 | ≈28 | 0.16 |
| [14] | Semiconductor | 1.40-2.00 | ≈10 | 0.64 |
| [15] | MEMS | 3.55-4.71 | ≈3 | ≈8 |
| [16] | MEMS | 4.30-5.50 | ≈10 | 1.0 |
| [17] | MEMS | 0.70-2.26 | ≈50 | 0.6 |
| [18] | MEMS | 1.50-2.50 | ≈20 | 0.7 |
| [18] | MEMS | 2.60-3.60 | ≈15 | 0.7 |
| [18] | MEMS | 3.70-5.40 | ≈15 | 1.2 |
| [19] | Semiconductor | 0.95-1.48 | ≈13 | 1.87 |

Therefore, it can be stated that electronically tunable filter technology is already capable of achieving high tuning range using small-sized filters. The major pitfall of electronically tunable filters is their poor selectivity. For example, the percentage bandwidth of SAW filters can easily be made less than 5%, while for the filters listed in Table 1, it is more than 20% on average. MEMS technology is the most promising to fabricate selective and tunable pre-selector filters. It is projected that the unloaded quality factor of this technology is going double in the next decade. Even if its selectivity improves, however, MEMS technology still suffers from other limitations such as poor power handling capability. In summary, it can be concluded that tunable RF filter technology is still immature for use in commercial radios. Thus, it is likely that flexible RF front-ends will remain poorly selective for foreseeable future.

Another approach assumes that pre-selector filters of flexible RF front-ends are poorly selective and, as a result, seek techniques that can improve the linearity performance of receiver RF front-ends. Before reviewing the different techniques, however, it is important to categorize the types of non-linearity distortions expected in receiver RF front-ends.

There are basically two types of non-linearity distortions in receiver RF front-end. These are inherent non-linearity and undesired non-linearity. Undesired non-linearity can further be classified to weak non-linearity and strong non-linearity.

Inherent non-linearity distortions are produced by RF front-end elements that are desired to be non-linear for the normal operation of the receiver. For example, mixers have to be non-linear to be able to shift the frequency of the input signal. Similarly, the sampling process in the ADC has to be non-linear to discretize the analog signal. However, signals, which are located at different frequencies at the input of an inherently non-linear element, may map to overlapping frequencies at the output. The set of frequencies at the input, which map to the same frequency at the output of the element, are referred as images. When a signal passes through a mixer and an ADC, the desired signal is potentially corrupted by undesired signals, which are located at the corresponding image frequencies.

Weak non-linearity is the most widely studied type of RF front-end non-linearity. Weak non-linearity distortion is a small signal characteristic. The effects of weak non-linearity include odd and even order intermodulation distortions. Intermodulation distortions occur when two strong signals produce an intermodulation product at the frequency band of the desired signal. The other type of weak non-linearity distortion occurs when a weak desired signal arrives at the input of the receiver along with an undesired strong signal. The envelope of the strong signal distorts the desired signal by modulating the gain of the receiver RF front-end. Weak non-linearity is typically quantified using parameters such as third order input referred to as intercept point (IIP3) and second order input referred intercept point (IIP2).

The other type of undesired non-linearity is strong non-linearity or clipping. It is a large signal characteristic, which is determined by the voltage and current supply of the elements of the RF front-end. For this reason, strong non-linearity is generally independent of the small signal attributes of the RF front-end. Strong non-linearity can be quantified using the input referred saturation power ($P_{sat}$) of the RF front-end element. The term $P_{sat}$ represents the maximum power of a continuous wave input signal that passes through the element without clipping. Typically, the effect of strong non-linearity is observed when an undesired strong signal, with power level greater than $P_{sat}$, reaches the input accompanying a desired weak signal. Due to strong non-linearity, the envelope of the strong undesired signal distorts the desired signal by modulating the gain of the strongly non-linear element.

Furthermore, it should be noted that non-linearity distortions may be frequency dependent or independent. Frequency dependent distortions affect the desired signal only if it is located at certain frequencies in the spectrum. The energy distribution in the input spectrum, the local oscillation frequency ("LO" or "LOF") and the sampling frequency determine which frequencies are vulnerable to frequency dependent distortions. Intermodulation distortions due to weak non-linearity and all the inherent non-linearity distortions fall under the category of frequency dependent distortions.

On the contrary, frequency independent distortions corrupt the desired signal irrespective of its frequency location relative to that of the undesired signals. Variable gain-compression distortion due to weak and strong non-linearity falls under the category of frequency independent distortion.

Circuit level linearization is typically used to reduce the effects of weak non-linearity. For example, it has been shown that a linear feedback can be used to improve linearity of the RF front-end by canceling the weak non-linearity distortion components. A technique in which the biasing point of transistors is adjusted to obtain optimal weak non-linearity performance has also been proposed. Furthermore, the use of an auxiliary circuit path to cancel the weak non-linearity distortion components of the signal has also been proposed. Using these linearization techniques, sub-micron CMOS LNAs with IIP3 in excess of 10 dBm have been reported.

Another proposed solution provides a network level technique which relaxes the linearity and selectivity specifications of receiver RF front-ends. In this technique, the transmission frequency is adjusted to evade frequency dependent weak non-linearity distortions. That is, the radio selects the frequency band which is not only unoccupied but also has less chance to be interfered by intermodulation products created by strong signals in the spectrum. Empirical experiments show that this technique can effectively relax IIP3 specification of the receiver without actually changing the linearity or selectivity of the RF front-end.

However, similar achievement has not been attained for strong non-linearity as it requires relatively higher undesired power to produce sizable strong non-linearity effects. The problem becomes even more significant when the pre-selector filter is poorly selective, and the spectrum is expected to become increasingly energetic and deregulated as it is in the case of DSA based networks.

Strong non-linearity distortions can be reduced by increasing the voltage or current bias of the RF front-end. But, this technique increases the power consumption of the receiver. Otherwise, there has been no linearization technique proposed to combat strong non-linearity. The circuit level linearization techniques that were developed for weak non-linearity are not applicable for strong non-linearity. These techniques fail to address strong non-linearity because they were developed considering the small signal models while strong non-linearity is a large signal characteristic.

Traditionally, strong non-linearity is combated by avoidance. That is, automatic gain control (AGC) is used to avoid strong non-linearity distortions at the expense of the signal to noise ratio (SNR) of the desired signal. The AGC pushes the weak desired signal down into the noise floor as it attempts to fit the strong undesired signal in the dynamic range of the receiver. Techniques which can improve the strong non-linearity performance with minimal effect on the SNR of the wanted signal are desired.

The problem of inherent non-linearity of mixers has been recognized since the inception of radios. That is, receiver architectures that use quadrature down-conversion are being used to cancel image signals during down-conversion. However, quadrature down-conversion based architectures can also suffer from image signals due to imperfect cancellation of the images. This is because of the gain and amplitude imbalance between the real and imaginary paths. Hence, the image rejection ratio of a typical RF front-end is not more than 50 dB. That means a −40 dBm image signal can significantly degrade the performance of a −85 dBm desired signal even if the image rejection of the RF front-end is as high as 50 dB.

Anti-aliasing filters may be used to remove possible aliasing signals before sampling in the ADC. However, anti-aliasing filters also have limited rejection capability. For example, a $6^{th}$ order, 0.5 dB equal ripple anti-aliasing filter can have up to 50 dB rejection in the second Nyquist zone. That means signals as powerful as −40 dBm or more can easily degrade the performance of a −85 dBm desired signal due to aliasing, even though the receiver has high performance baseband filters.

In summary, as the spectrum grows to be more energetic and less regulated, the image rejection ratio and the anti-aliasing filter performance in a typical RF front-end can quickly become inadequate. As a result, in one embodiment, the present invention provides techniques which can address inherent non-linearity distortions of a receiver operating in energetic spectrum scenarios. In one aspect, the present invention assumes that flexible receivers are poorly selective. It proposes a receiver architecture that is designed to make a poorly selective receiver robust against the effects of non-linearity distortions. The proposed receiver architecture addresses not only weak non-linearity, but also inherent non-linearity and strong non-linearity. This is without requiring improvement in selectivity of the pre-selector filter, saturation power level of the RF front-end, selectivity of the anti-aliasing filter, or the image rejection ratio of the mixers. In this embodiment, the present invention provides an architecture that is a fully receiver based solution that has application in many wireless systems. In addition, in other embodiments, the present invention provides an architecture that reduces and may eliminate the need for network level adjustments.

Figure 2:
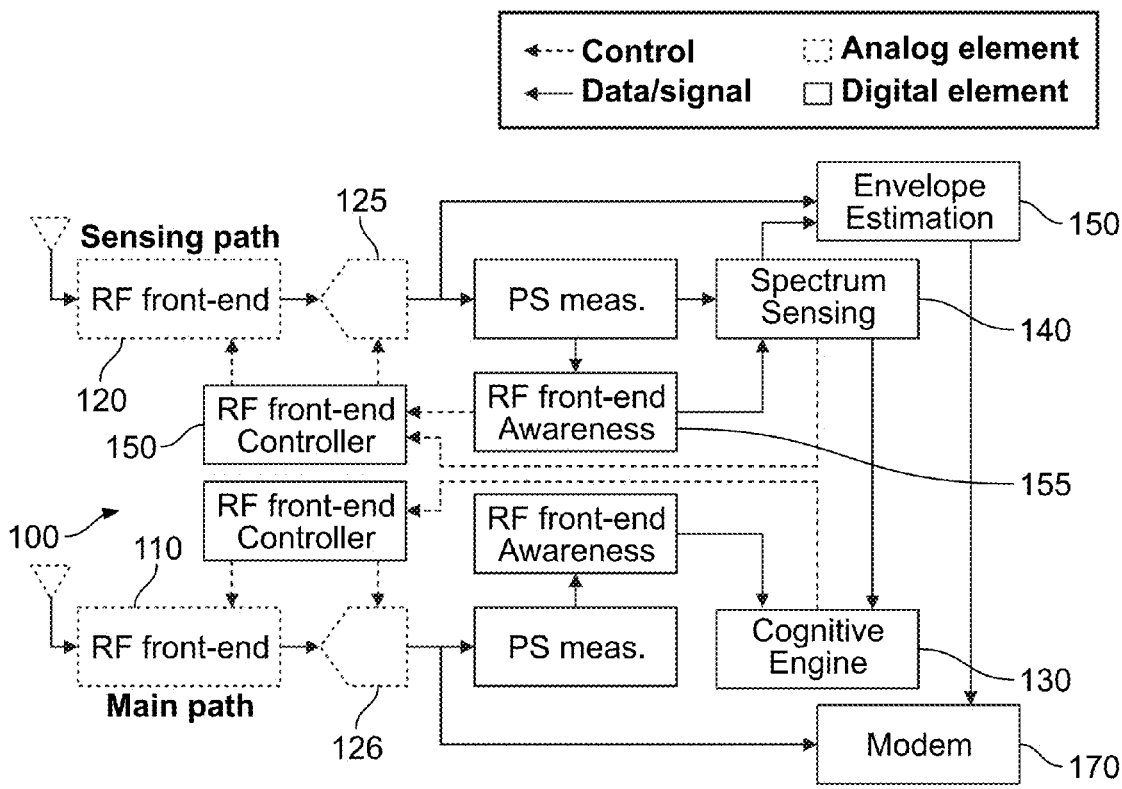
FIG. 2 illustrates a proposed receiver architecture.

FIGS. 1 and 2 show embodiments of the present invention concerning a receiver architecture. The modules contained in the architecture are designed to help a poorly selective receiver cope against non-linearity distortions. As shown in FIG. 1, in one embodiment, the present invention provides an architecture that uses the following steps: (1) Sensing path the signal path or radio path 120 by sampling using an Analog-to Digital Convertor 125 in the sensing path which is in communication with spectrum sensing module 140: (2) Providing the spectrum sensing data to cognitive engine 130 which analyzes the data to generate a main path configuration command which is communicated to Radio path Controller 150; (5) main radio path 110 also has a signal that is sampled by Analog-to-Digital Convertor 126 and sent to digital radio path processor 160.

As shown in FIG. 2, the present invention, in an embodiment, provides architecture 100 that contains two RF paths, main path 110 and sensing path 120. In a specific embodiment, main path 110 is a main radio path which is tuned to a desired frequency band. Sensing path 120 is used to monitor the spectrum around the desired frequency band. To minimize effects of undesired non-linearity on sensing, sensing path 120 may have a lower gain setting.

In other embodiments, a cognitive engine 130 having an algorithm may be provided. Cognitive engine 130 determines the optimal setting of the main RF front-end with respect to the current state of the spectrum. Spectrum sensing module 140 provides information about the state of the spectrum in real-time to cognitive engine 130. Spectrum sensing module 140 uses sensing path 120 to measure the state of the spectrum. RF front-end controller 150 of main path 110 adjusts the settings of the RF front-end based on the decisions of the cognitive engine.

In other embodiments, the received spectrum is modeled by channelizing it to equal bandwidth sub-bands. This model is here-by called channelized spectrum (CS). In the CS model, a signal is represented by a vector whose elements are equal to the average power contained in the corresponding sub-band. The CS measurement module measures the CS of the signal at the output of the ADC. The RF front-end is also modeled in the CS domain with a matrix that transforms the CS of the received signal to the CS of the signal at the output of the ADC.

Both cognitive engine 130 and the spectrum-sensing module 140 are configured to assume to know the characteristics of the RF front-end in priori. The RF front-end awareness module 155 autonomously measures the CS model of the RF front-end. It then reports the result of the measurement to spectrum sensing module 140 and cognitive engine 130, respectively.

The envelope estimation module 160 measures the time-domain effects of strong non-linearity on the desired signal. This module reports the result of the estimation to modem 170. Modem 170 uses the information to reconstruct the desired signal after it is corrupted by strong non-linearity of the main RF front-end.

Cognitive engine 130 controls a local oscillator frequency and the sampling frequency in receiver radios. Cognitive engine 130 may be adapted to dynamically optimize the frequency plan of the RF front-end to minimize distortions on a desired signal by shifting it away from the images and aliases of undesired signals. In doing so, cognitive engine 130 obviates the need of strong filtering at the input of the receiver.

In other embodiments, the present invention provides an architecture that also contains wideband spectrum sensing algorithm which is specifically suited for receivers with poor pre-selection. Due to poor selectivity, effects such as aliasing and image signals can degrade the accuracy of spectrum sensing. In other embodiments, the present invention provides a channelized spectrum domain based model which can represent an inherently non-linear RF front-end using a matrix. The algorithm uses the pseudo-inverse of the matrix to remove the imperfections of the RF front-end from a raw spectrum sensing data.

Cognitively controlling the frequency plan of the RF front-end protects the desired signal from frequency dependent distortions such as image signals. If very strong adjacent channel signal resides within the pass-band of the pre-selector filter, it can produce significant distortion irrespective of the frequency location of the desired signal. To address this issue, in other embodiments, the present invention provides a receiver mechanism that reconstructs the desired signal after it is distorted by strong adjacent channel signals in the RF front-end. This embodiment employs a low-gain alternative RF path to measure the envelope of the strongest signal in order to estimate the compression on the desired signal at real-time. The embodiment introduces the reverse of the compression on the desired signal before demodulation. This way, the mechanism can improve the performance of the radio in presence of unfiltered strong adjacent channel signals.

Figure 3:
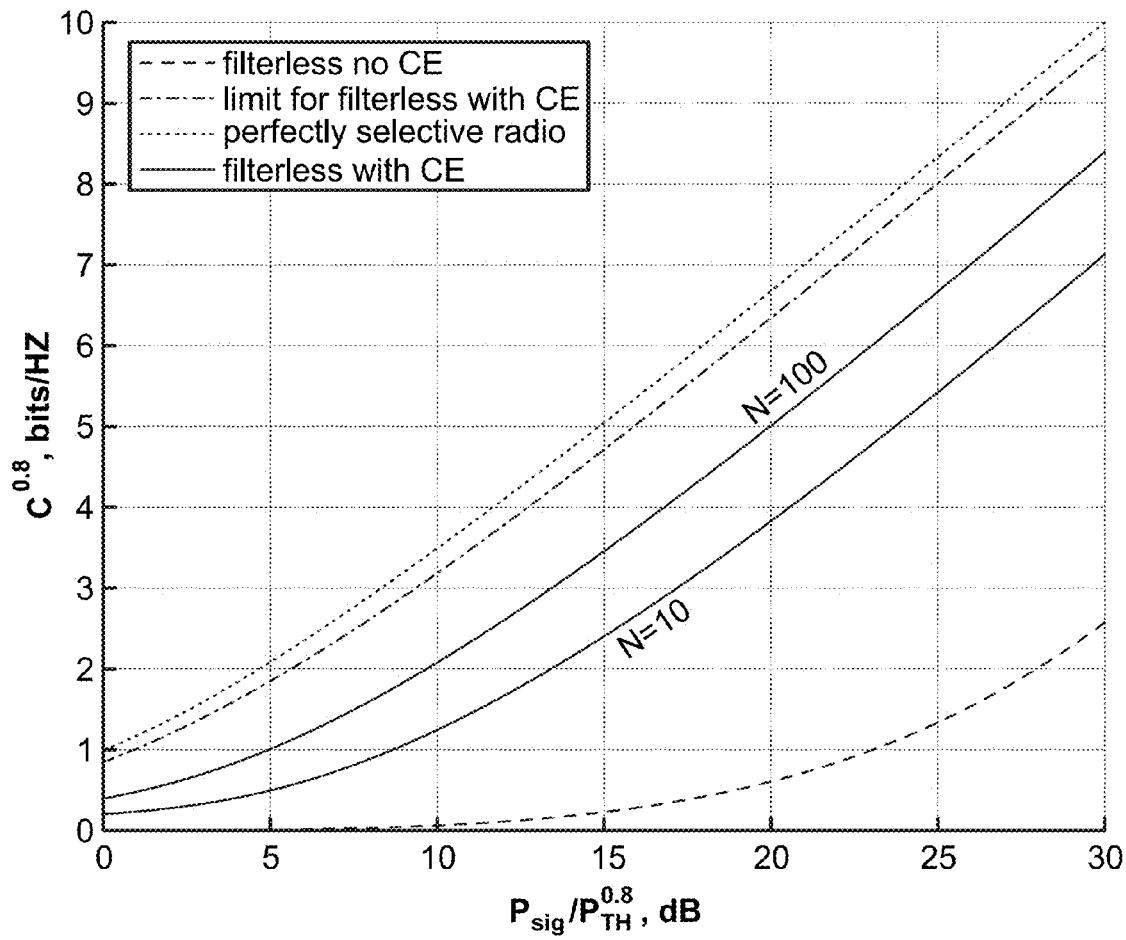
FIG. 3 is a comparison in terms of a capacity metric (N represents number of cognitive engine trials).

FIG. 3 shows the performance obtained from a simulation of cognitive engine based control over the sampling frequency and the local oscillator frequency. The horizontal axis represents the power of the signal normalized by the noise power. The vertical axis represents capacity, which is directly related to throughput.

As shown, capacity (throughput) increases along with increase in signal power. The top curve is obtained when an ideally selective pre-selector filter is used. The bottom curve is obtained when no pre-selector filter is used. The two solid line curves were obtained using a cognitive engine in an RF front-end with no pre-selector filter. The curves show that the cognitive engine artificially makes an RF front-end appear like it has a pre-selector filter, without using any pre-selector filter.

As shown, the embodiments of the present invention provide a robust receiver that is able to operate even when inherent non-linearity distortions and strong non-linearity distortions are present. The receiver architecture of the present enables building reliable receivers using inexpensive, small-size, poorly selective RF front-ends.

Table 3 provides a high-level comparison of the architecture of the present invention with that of a flexible highly selective receiver and a flexible poorly selective receiver.

TABLE 1

Comparison of flexible receiver RF front-ends

|  | Highly Selective | Poorly Selective | Poorly Selective with Proposed Architecture |
|---|---|---|---|
| Size | ∞∞∞∞∞∞∞∞ | ∞ | ∞∞∞ |
| Performance | ☺☺☺☺☺ | ☺ | ☺☺☺☺ |
| Cost | $$$$$ | $ | $$ |

The embodiments of the present invention have application in various segments of the wireless industry. For example, the embodiments of the present invention may be used make to make small sized, highly flexible military radios. The main advantage of these radios is that they can change their functionality and parameters on-the-fly to prevent jamming. For example, in this embodiment, radios being used by a given combat unit may be operating on frequency band A. If an enemy learns this and jams frequency band A, then, the mission will be jeopardized because of lack of communication between members of the combat units. If the radios are intelligent and flexible enough to switch to another frequency band, they will be more robust against jamming attacks. The present invention provides embodiments that enable the use of receiver RF front-ends for use in intelligent and highly flexible radios.

In addition, as wireless use becomes increasingly prevalent, fixed frequency based wireless communication will become ineffective. One example of this is how slow WiFi based Internet becomes when there are multiple users sharing the same WiFi band. In other aspects, the present invention provides embodiments including wireless devices having the ability to access airwaves through multiple frequency bands to improve the quality of service to the user.

Two metrics are commonly used to measure the performance of spectrum sensing systems. These are probability of PU detection and probability of false alarm. Probability of false alarm, $q_{FA}$, can also be understood in terms of probability of detecting the absence of the PU, $q_{OD}$, as $q_{OD}=1-q_{FA}$. The probability of detecting the absence of PU is simply referred as probability of opportunity detection.

It is desirable to have higher probability of PU detection to minimize the interference on the PU. It is also desirable to have high probability of opportunity detection to maximize the throughput of the CRs. I/Q imbalance and aliasing do not affect the PU detection performance of the CR. However, the opportunity detection performance of CRs significantly degrades due to I/Q imbalance and aliasing. As a result, in one embodiment, the sensing mechanism of the present invention improves the opportunity detection performance of a CR that is hampered by receiver impairments.

Generally, spectrum sensing is framed as a detection problem. In certain aspects, the present invention frames spectrum sensing as an estimation problem. Hence, the proposed sensing mechanism is focused on maximizing the accuracy of spectrum sensing instead of maximizing the probability of PU detection. In other words, the proposed sensing mechanism is not attempting to determine if the power level is above or below a certain threshold. However, the mechanism attempts to estimate the actual power level in each channel.

Figure 4:
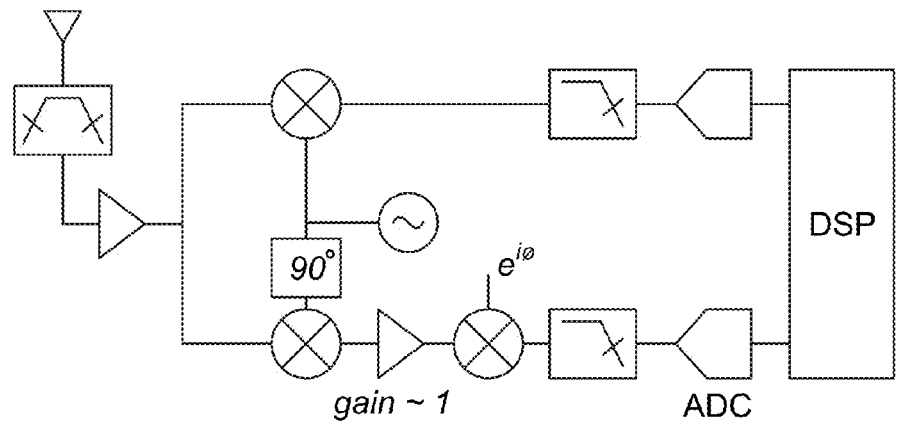
FIG. 4 illustrates a sensing RF front-end architecture.

A direct-conversion type receiver as shown in FIG. 4 may be provided. The passbands of the antenna and the pre-selector filter encompass all the opportunistic access bands. After the pre-selector filter, the received signal passes through a low noise amplifier (LNA). The LNA is assumed be ideally linear. The output of the LNA is down-converted using quadrature mixers.

Ideally, the two branches of the quadrature mixer are perfectly balanced in both amplitude and phase such that mirrored (image) signals would be completely rejected. However, the two branches will always have some level of mismatch between each other. This mismatch is commonly referred as I/Q imbalance. The mismatch leads to finite image rejection that ranges between 25 and 60 dB in typical direct-conversion receivers.

After the down-conversion, the baseband signal is passed through anti-aliasing filters before it is sampled by ADCs and reaches the digital signal processor (DSP). Ideally, the anti-aliasing filter is brick-walled and it rejects all signals outside the first Nyquist zone. However, practical filters never have infinite rejection in their stop-band; and thus, some level of aliasing will always occur.

Figure 5:
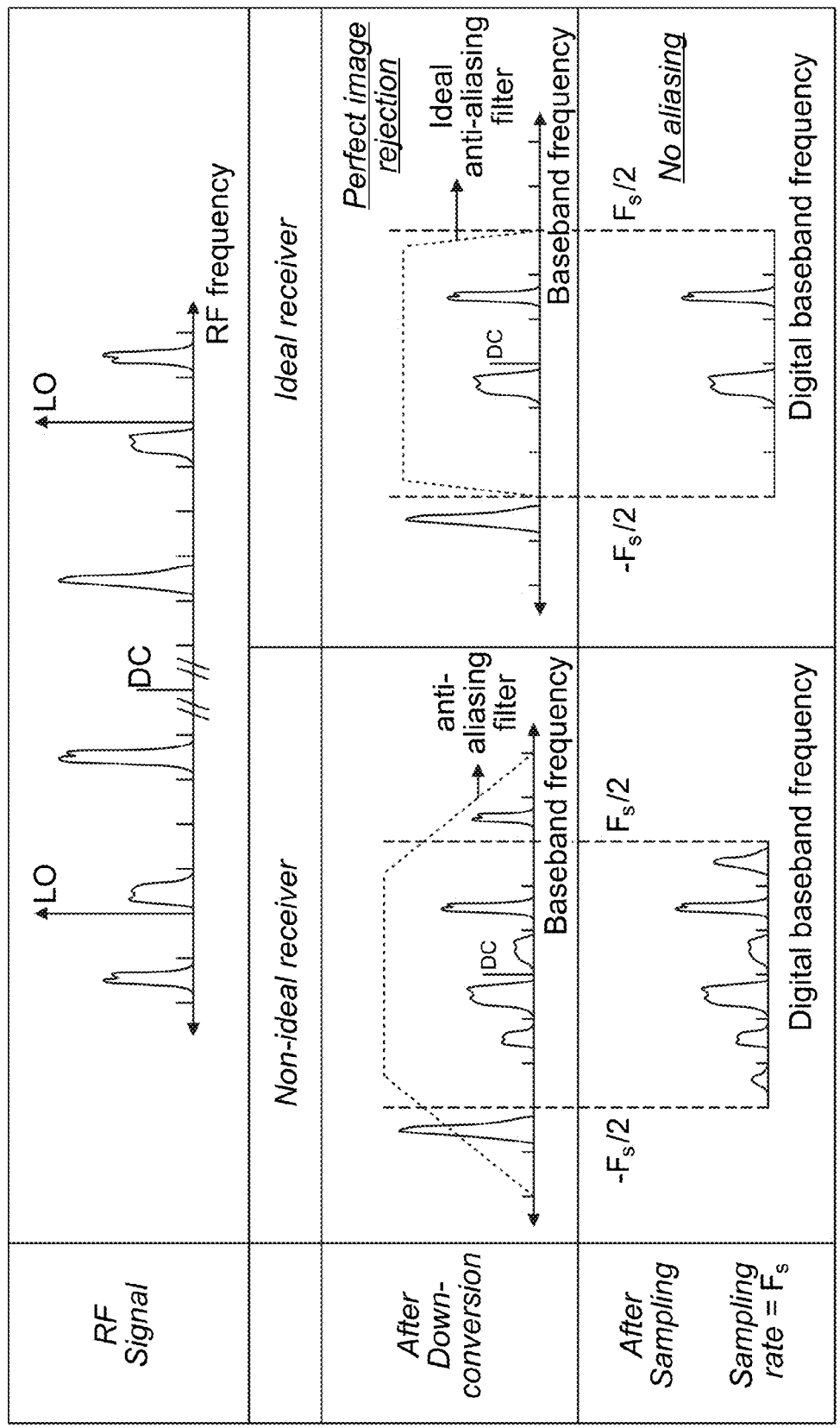
FIG. 5 is a comparison of ideal and non-ideal direct conversion receiver.

The effects of I/Q imbalance and imperfect anti-aliasing filter are illustrated in FIG. 5, which shows how down-conversion and sampling re-shuffle the energies of RF signals (and their mirrors) in the frequency domain. The original RF signal contains three active signals and their mirrors. Ideally, the down-conversion mixer shifts the positive frequency signals to baseband and eliminates their mirrors. However, attenuated version of the mirrored signals appears at baseband due to I/Q imbalance.

In addition, it can be seen that the strongest RF signal and its mirror map to a baseband frequency outside the first Nyquist zone (from $-F_s/2$ to $F_s/2$) of the ADC. Ideally, these signals would be perfectly rejected by the anti-aliasing filter. In a non-ideal receiver, however, the finite rejection at the anti-aliasing filter's stop-band allows the folding of strong signals from higher-order Nyquist zones into the first Nyquist zone.

Typically, spectrum sensing systems can measure the energy content of the signal only at digital baseband. However, the goal of spectrum sensing is to determine the state of the spectrum at the receiver input. However, the energy content at digital baseband of a non-ideal receiver may not reflect the state the spectrum at the receiver input. In FIG. 5, the state of a sparsely occupied RF spectrum appears to be fully occupied at digital baseband. In one embodiment, the present invention provides a mechanism that can estimate the actual state of the spectrum by filtering the contributions of receiver impairments from sensing data obtained at digital baseband.

In one embodiment, the present invention uses channelized spectrum representation (CSR) of signals. This representation chops a signal into multiple equal-bandwidth sub-bands. The overall signal x(t) is the sum of the signals contained within each sub-bands, i.e.

$$x(t) = \sum_{i=-\infty}^{\infty} \tilde{x}_i(t) \qquad (1)$$

and, $$\tilde{x}_i(t) = x(t) * \mathcal{J}^{-1}\left\{\Pi\left(\frac{f-f_i}{\Delta}\right)\right\} \qquad (2)$$

where, $\tilde{x}_i(t)$ is the signal contained in the $i^{th}$ sub-band, $\Delta$ is the bandwidth of each sub-band, $f_i$ is the center frequency of the $i^{th}$ sub-band, and i is an integer. The operators * and $\mathfrak{I}^{-1}$ represent convolution and inverse Fourier transform, respectively. The frequency domain function $\Pi(\bullet)$ denotes a brick-walled filter centered at $f_i$ with bandwidth $\Delta$.

The average power contained in the $i^{th}$ sub-band is computed as, $$P_x[i]=E\{|x_i(t)|^2\} \quad (3)$$

where $E\{\bullet\}$ is an expectation operator.

Finally, CSR of x(t) is given by an infinite length vector, $$P_x=[\ldots,p_x[i-1],p_x[i],p_x[i+1],\ldots]^T \quad (4)$$

CSR can be computed for the signals obtained at different stages in the receiver. For example, CSR can be computed for the input RF signal, the output of the mixer, the output of anti-aliasing filter, and the output of the ADC. A CSR model can also be defined for receiver elements such as a mixer, a filter, or ADC. The CSR model of a receiver element is defined as the transformation between the input CSR and the output CSR of the element.

Figure 6:
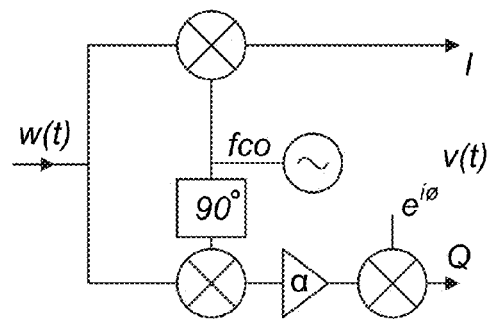
FIG. 6 illustrates a quadrature mixer of an embodiment of the present invention.

A block diagram of a quadrature down-conversion mixer is shown in FIG. 6. The mixer down-converts a real-valued input signal w(t) to a complex-valued output signal v(t). The mixer uses a periodic signal with frequency $f_{LO}$ to down-convert w(t) to v(t).

Assume $f_{LO}$ is a natural number multiple of sub-band bandwidth $\Delta$. Thus, $f_{LO}=l\Delta$ for l=1, 2, . . . , and typically, l>>0.

The time domain model of a quadrature mixer is given by, $$v(t)=w(t)\cos(2\pi l\Delta t)+j(1+\alpha)e^{j\phi}w(t)\sin(2\pi l\Delta t) \quad (5)$$

Using (1), (2) and (3), and assuming that the signals contained in different sub-bands are uncorrelated to each other, it can be shown;

$$p_v[i]=p_w[l+i]+\beta p_w[l-i] \quad (6)$$

where, $$\beta = \left|\frac{1-(1+\alpha)e^{j\phi}}{1+(1+\alpha)e^{j\phi}}\right|^2 \quad (7)$$

and the image rejection ratio is given in dB as IIR=10 log($\beta$).

The pre-selector filter shown in FIG. 4 limits the reception bandwidth of the received signal. Hence, it is reasonable to assume finite-length CSR vectors. For example, the number of sub-bands in CSR of the mixer input can be computed as the ratio of the reception bandwidth of the pre-selector filter to the sub-band bandwidth. In addition, it is sufficient to consider only positive frequency sub-bands of an RF signal because it is real-valued. At baseband, however, both negative and positive frequencies are considered because the signal is complex valued.

Then, (4) is modified by letting $P_w=[p_w[1], p_w[1], \ldots, p_w[N]]^T$ where N is the number of RF sub-bands (in positive frequency). The number of baseband sub-bands will also be equal to N. Accordingly, $P_v=[p_v[1], p_v[2], \ldots, p_v[N]]^T$.

Figure 7:
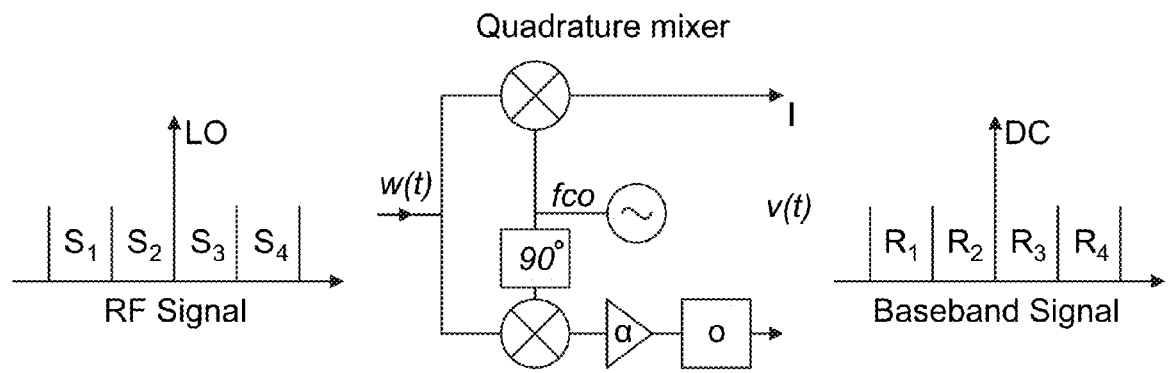
FIG. 7 illustrates an example quadrature mixer downconversion of an embodiment of the present invention.

Assume the RF signal contains four sub-bands and the LO frequency is at the middle of the reception bandwidth as shown in FIG. 7.

The average powers in the RF sub-bands are given by $S_1$, $S_2$, $S_3$ and $S_4$. Similarly, the average powers in baseband sub-bands are given by $R_1$, $R_2$, $R_3$ and $R_4$. From (6), $R_1=S_1+\beta S_4$, $R_2=S_2+\beta S_3$, $R_3=S_3+\beta S_2$, and $R_4=S_4+\beta S_1$. This can be written in matrix form as, $$\begin{bmatrix} R_1 \\ R_2 \\ R_3 \\ R_4 \end{bmatrix} = \begin{bmatrix} 1 & 0 & 0 & \beta \\ 0 & 1 & \beta & 0 \\ 0 & \beta & 1 & 0 \\ \beta & 0 & 0 & 1 \end{bmatrix} \begin{bmatrix} S_1 \\ S_2 \\ S_3 \\ S_4 \end{bmatrix} \quad (8)$$

Hence, the CSR model of the quadrature mixer in FIG. 7 is given by the matrix, $$A_{mix} = \begin{bmatrix} 1 & 0 & 0 & \beta \\ 0 & 1 & \beta & 0 \\ 0 & \beta & 1 & 0 \\ \beta & 0 & 0 & 1 \end{bmatrix} \quad (9)$$

Note that the elements of $A_{mix}$ are function of the LO frequency. For this reason, the matrix is referred as $A_{mix}(f_{LO})$.

Figure 8:
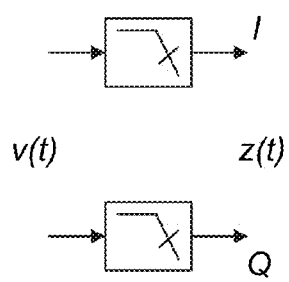
FIG. 8 illustrates an example quadrature baseband filter of an embodiment of the present invention.

As shown in FIG. 8, the input of the baseband filter is a complex-valued signal v(t), and the output is a complex-valued signal z(t).

The time domain characteristics of a complex filter is given by, $$z(t)=w(t)*h(t) \quad (10)$$

where h(t) is the impulse response of the filter. Approximating the frequency response of the baseband filter in the $i^{th}$ sub-band by the response at the center of the sub-band, CSR model of the baseband filter becomes, $$p_z[i] \approx p_v[i]|H_i|^2 \quad (11)$$

where $H_i$ is the response at the center of the $i^{th}$ sub-band.

Figure 9:
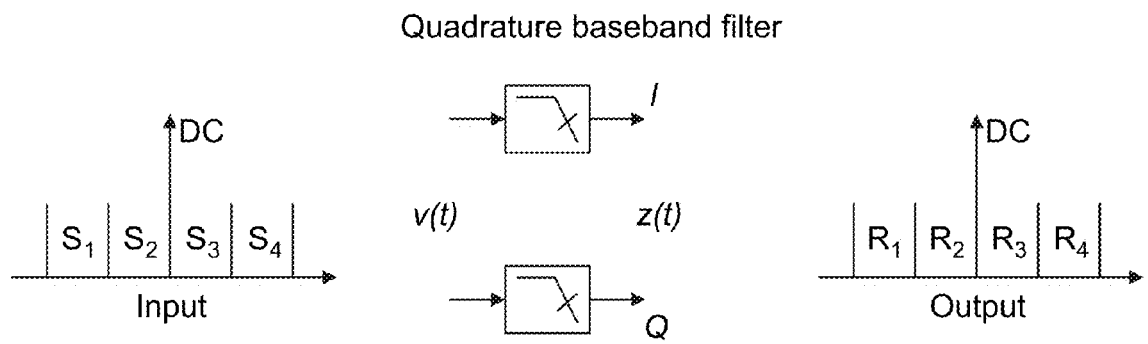
FIG. 9 illustrates example quadrature baseband filtering of an embodiment of the present invention.

Assume the input of the baseband filter contains four sub-bands. The frequency response of the filter at the center of each sub-band is given by $H_1$, $H_2$, $H_3$ and $H_4$, respectively. As shown in FIG. 9, the average power in the input sub-bands are given by $S_1$, $S_2$, $S_3$ and $S_4$. Similarly, the average powers in the output sub-bands are given by $R_1$, $R_2$, $R_3$ and $R_4$.

From (11), $R_1=S_1|H_1|^2$, $R_2=S_2|H_2|^2$, $R_3=S_3|H_3|^2$, and $R_4=S_4|H_4|^2$. This can be written in matrix form as, $$\begin{bmatrix} S_1 \\ S_2 \\ S_3 \\ S_4 \end{bmatrix} = \begin{bmatrix} |H_1|^2 & 0 & 0 & 0 \\ 0 & |H_2|^2 & 0 & 0 \\ 0 & 0 & |H_3|^2 & 0 \\ 0 & 0 & 0 & |H_4|^2 \end{bmatrix} \begin{bmatrix} R_1 \\ R_2 \\ R_3 \\ R_4 \end{bmatrix} \quad (12)$$

Hence, CSR model of the quadrature filter in is given by the matrix, $$A_{fil} = \begin{bmatrix} |H_1|^2 & 0 & 0 & 0 \\ 0 & |H_2|^2 & 0 & 0 \\ 0 & 0 & |H_3|^2 & 0 \\ 0 & 0 & 0 & |H_4|^2 \end{bmatrix} \quad (13)$$

Figure 10:
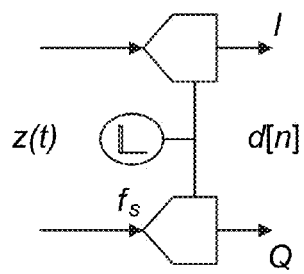
FIG. 10 illustrates an ADC of an embodiment of the present invention.

A quadrature analog-to-digital converter (ADC) is assumed. The block diagram of this ADC is shown in FIG. 10. The time domain model of the ADC is, $$d[n]=z(t)|_{t=nT_S} \quad (14)$$

where $T_S=1/f_S$, and $f_S$ is the sampling rate. It is assumed $f_S$ is a natural number multiple of sub-band bandwidth, $\Delta$. Thus, $f_S=s\Delta$ for $s=1, 2, \ldots$, Using (1), (2) and (3), and assuming that the signals contained in different sub-bands are independent to each other, it can be shown that, $$p_d[i] = (s\Delta)^2 \sum_{k=-\infty}^{\infty} p_z[i-ks] \quad (15)$$

As shown in 11, assume the input of the ADC contains six active sub-bands and the output contains only two sub-bands (i.e., s=2).

The average power in the input sub-bands is given by $S_1$, $S_2$, $S_3$, $S_4$, $S_5$ and $S_6$. Similarly, the average power in the output sub-bands is given by $R_1$ and $R_2$. From (15), $R_1=S_1+S_3+S_5$ and $R_2=S_2+S_4+S_6$. In the matrix form, we have $$\begin{bmatrix} R_1 \\ R_2 \end{bmatrix} = \begin{bmatrix} 1 & 0 & 1 & 0 & 1 & 0 \\ 0 & 1 & 0 & 1 & 0 & 1 \end{bmatrix} \begin{bmatrix} S_1 \\ S_2 \\ S_3 \\ S_4 \\ S_5 \\ S_6 \end{bmatrix} \quad (16)$$

Figure 11:
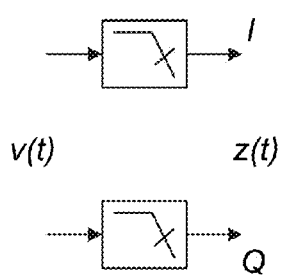
FIG. 11 illustrates ADC sampling of an embodiment of the present invention.

Hence, the CSR model of the ADC in FIG. 11 is given by the matrix, $$A_{ADC} = \begin{bmatrix} 1 & 0 & 1 & 0 & 1 & 0 \\ 0 & 1 & 0 & 1 & 0 & 1 \end{bmatrix} \quad (17)$$

The elements of $A_{ADC}$ and its dimensions are a function of the sampling rate. For this reason, the matrix is referred as $A_{ADC}(f_s)$.

The matrix models of the mixer, the baseband filter, and the ADC can be multiplied as shown in (18) to obtain CSR model of the receiver between the pre-selector filter and the DSP. That is, $$A(f_{LO},f_S)=A_{ADC}(f_S)A_{fit}A_{mix}(f_{LO}) \quad (18)$$

where $A(f_{LO},f_S)$ is the channelized spectrum (CS) transform of the receiver.

The CS transform of the receiver transforms CSR of the mixer input to CSR of the ADC output. That is, $$P_d(f_{LO},f_S)=A(f_{LO},f_S)P_w+V(f_{LO},f_S) \quad (19)$$

where the vector V accounts for the power of internally generated signals, such as additive noise and spurs. The vector V is referred as the zero-input CS response of the receiver. The vectors $P_d$ and $P_w$ are CSR of the mixer input and the ADC output, respectively.

The opportunistic bands of a cognitive radio may span across large range of frequency. A S-MSS-based CR senses only a section in the spectrum at a time; and steps through multiple sections by changing the LO frequency. The state of the spectrum is assumed to stay constant during one S-MSS measurement cycle. Consider a spectrum containing N active sub-bands. Then a $N_B$ step S-MSS can be formulated in CSR domain as, $$\begin{bmatrix} P_d(f_{LO,1}, f_s) \\ P_d(f_{LO,2}, f_s) \\ \vdots \\ P_d(f_{LO,N_B}, f_s) \end{bmatrix} = \begin{bmatrix} A(f_{LO,1}, f_s) \\ A(f_{LO,2}, f_s) \\ \vdots \\ A(f_{LO,N_B}, f_s) \end{bmatrix} P_w + \begin{bmatrix} V(f_{LO,1}, f_s) \\ V(f_{LO,2}, f_s) \\ \vdots \\ V(f_{LO,N_B}, f_s) \end{bmatrix} \quad (20)$$

Note that sampling rate is assumed to be the same for all sensing sections. Consider $\check{A}$ is a $sN_B \times N$ matrix formed by concatenating A matrix corresponding to different LO frequencies. This matrix is referred as multi-LO-CS transform of the receiver. Similarly, $\check{P}_d$ and $\check{V}$ are both $sN_B \times 1$ vectors formed by concatenating $P_d$ and V, respectively. The vector $\check{V}$ is referred as the multi-LO-zero-input CS response of the receiver. Accordingly, (20) can be re-written as, $$\check{P}_d = \check{A}P_w + \check{V} \quad (21)$$

The CSR model in (21) is a compact way to track how energy is redistributed as signal propagates through a non-ideal receiver.

The objective of energy-measurement-based multi-band spectrum sensing is to estimate the CSR of a receiver input. However, the DSP that carries out the computation of spectrum sensing can observe the CSR of the ADC output only. In practical radio receivers, however, CSR of the ADC output may not be accurate depiction of CSR of the receiver input due to radio imperfections (cf. FIG. 5).

As discussed above, I/Q imbalance and aliasing reshuffle the signal energies inside the receiver. The model given in (21)(21) easily captures how energy is redistributed inside the receiver. By reversing this model, the state of the spectrum at the receiver input can be estimated by collectively observing CSR of the ADC output at different LO frequencies. In other words, the mechanism estimates for $\check{P}_w$ in (21) (21) given $\check{P}_d$, and prior knowledge of $\check{A}$ and $\check{V}$.

Either digital filter banks or fast-frequency-transform (FFT) with windowing can be used to measure CSR. In another embodiment, the present invention uses FFT with Blackman window to measure CSR of the ADC output. The Blackman window is selected because it has side-lobe levels lower than most other windowing functions. Because of its low side-lobe levels, the Blackman window has relatively wider main-lobe and introduces leakage between adjacent sub-bands if the FFT size equal to the number of sub-bands.

The width of the main lobe for a Blackman window is approximated to be equal to $12\pi/N_{FFT}$, where $N_{FFT}$ is the size of the window (or the size of the FFT). The size of the window should be large enough to constrain the main lobe within the sub-band bandwidth. This minimizes the leakage between adjacent sub-bands during CSR measurements. That is, $$\frac{12\pi}{N_{FFT}} < \frac{\Delta}{f_s} = \frac{1}{N_{sb}} \quad (22)$$

where $N_{sb}$ is the number of sub-bands in the first Nyquist zone. Hence, to satisfy the condition in (22), $N_{FFT} > 12\pi N_{sb}$.

Accordingly, multiple FFT samples fall within one sub-band. The average power in a sub-band is estimated by averaging both across frequency and time. First the magnitude-squares of all the FFT samples within a sub-band are averaged. Then, time-domain averaging is carried out across multiple FFT periodograms of the signal.

In yet other embodiments, the present invention uses an approximately maximum-likelihood estimator that is designed to obtain the CSR of the receiver input given the CSR of the ADC output. FFT perediograms are used to measure the CSR of the ADC output.

Measurement error is inevitable in CSR measurement of the ADC output. Hence, using (21)(21), the measured CSR of the ADC output can be given by, $$\check{P}_{d,m} = \check{A}P_w + \check{V} + W \quad (23)$$

where W is an $SN_B \times 1$ vector and it represents measurement error. Consider, $Z = \check{P}_{d,m} - \check{V}$, then, $$Z = \check{A}P_w + W \quad (24)$$

and the objective is to obtain $\hat{P}_w$, the estimate of $P_w$.

Understanding the statistical distribution of W is important to properly design the estimator. Assuming the true average power corresponding to the $j^{th}$ element of Z is given by $z_t[j]$, and assuming periodogram based CSR measurement is used, it can be shown that the distribution of the measurement error in the $j^{th}$ element is normally distributed with zero mean and variance given by $\sigma_j^2 = (z_t[j])^2/(2N_p)$; where $N_p$ is the number of periodograms used in the measurement.

Accordingly, the maximum likelihood (weighted least-squares) estimator of $P_w$ minimizes, $$\hat{P}_w = \arg\min_{P_w} \sum_{j=1}^{sN_B} \left(\frac{z[j] - \check{a}_j P_w}{z_t[j]}\right)^2 \quad (25)$$

where $\check{a}_j$ represents the $j^{th}$ raw of $\check{A}$ and $z[j]$ represents the $j^{th}$ element in Z. However, because the true value $z_t[j]$ is not known, it may be approximated with $z[j]$. Then, the estimator in (25) becomes, $$\hat{P}_w = \arg\min_{P_w} \sum_{j=1}^{sN_B} \left(\frac{z[j] - \check{a}_j P_w}{z_t[j]}\right)^2 \quad (26)$$

This estimator is a relative-error least-squares type because it normalizes the square of observed errors with the corresponding elements of the observation vector. This feature has a practical value in the CSR measurement. Note that the elements of the observation vector (Z) can have very high dynamic range; the normalization ensures that strong signals do not overshadow the weak signals in the operation of the estimator.

To illustrate this consider a CSR measurement of a spectrum containing a −20 dBm signal and a −80 dBm signal in Table III. The table compares relative and absolute errors in milliwatt scale assuming ±1 dB measurement error on both signals.

TABLE III

NORMALIZING ERROR

| Power in dBm | | Power in Milliwatt | | Absolute error in Milliwatt | Relative error in Milliwatt |
|---|---|---|---|---|---|
| True | Measured | True | Measured | | |
| −20 | −19 | 0.01 | 0.0126 | 0.0026 | 0.2057 |
| −80 | −79 | 1e−8 | 1.26e−8 | 2.59e−9 | 0.2057 |
| −20 | −21 | 0.01 | 0.0079 | 0.0021 | 0.2589 |
| −80 | −81 | 1e−8 | 7.94e−9 | 2.06e−9 | 0.2589 |

It can be observed that the absolute errors have six orders of magnitude difference. On the other hand, the relative errors in milliwatt scale have comparable values similar to the absolute error in dB scale. Accordingly, the error in the −20 dBm signal does not overshadow the error in the −80 dBm signal when a relative-error based estimator is employed.

The estimator in (26) can be re-written in more compact form as;

$$\hat{P}_w = (\check{A}^T R^{-1} \check{A})^{-1} \check{A}^T R^{-1} Z \quad (27)$$

where $R = \text{diag}(z[0]^2, z[1]^2, \ldots, z[sN_B-1])$.

To avoid the computational burden of matrix inversion in (27)(27), a simpler iterative algorithm to solve (26)(26) may be used. Leveraging the non-negativity of $\check{A}$, Z and $P_w$, sequential coordinate-wise algorithm (SCA) for non-negative least squares (NNLS) to implement the estimator may be used. The SCA is preferred due to its simplicity, compared to other traditional active-set-based NNLS algorithms. Its simplicity makes the algorithm favorable for hardware implementation. The SCA adapted from for spectrum sensing is presented in Table IV, where is the average power of additive noise in a sub-band at ADC output and $[p_m]$ is a vector whose elements are all equal to $p_m$.

TABLE IV

ALGORITHM OF THE DESIGNED ESTIMATOR

Notation: $\zeta = \{1,2,\ldots,n\}$, $\zeta_k = \zeta / k$, $H = (\check{A}^T R^{-1} \check{A})$, $h_k$ is the $k^{th}$ column of H and $H_{i,j}$ refers of the element of H at $i^{th}$ raw and $j^{th}$ column.

Algorithm: SCA-NNLS adapted for spectrum sensing

Input: $\check{A}$, Z
Initialization: n = 0, $P^0 = [p_m]$, $\mu^0 = -\check{A}^T R^{-1} Z$
Repeat: for k = 1 to N
 1. $P_k^{n+1} = \max(0, P_k^n - \mu_k^{n+1} / H_{k,k})$, $P_l^{n+1} = P_l^n$ for all $l \in \zeta_k$
 2. $\mu^{n+1} = \mu^n + (P_k^{n+1} - P_k^n) h_k$
Until: $^{max}(P^{n+1} - P^n) < p_m$ (the largest element in the vector $P^{n+1} - P^n$ is less than $p_m$)
Output: $\hat{P}_w = P^{n+1}$ This algorithm minimizes the effects of I/Q imbalance and aliasing. For this reason, it is referred as robust S-MSS (RS-MSS). However, the algorithm assumes prior knowledge of the receiver model.

The proposed estimator of one embodiment of the present invention assumes prior knowledge of a receiver's multi-LO-CS transform (or the $\check{A}$ matrix), and the multi-LO-zero-input CS response (the $\check{V}$ vector).

As it can be inferred from (19)(19), the zero-input CS response at a given LO may be obtained by measuring CSR of the ADC output while the receiver input is terminated with a matched load (no signal except noise is input to the receiver). The multi-LO-zero-input CS response can be obtained by repeating this measurement at all the relevant LO frequencies.

As it can be inferred from (19), a column of CS transform can be obtained by measuring the CSR of the ADC output and subtracting the zero-input CS response; while only one sub-band is active at the receiver input. That is, only one sub-band contains a signal with non-zero input power. The other columns of the CS transform can be obtained by sequentially activating the corresponding input sub-bands one at a time. By repeating the measurement at different LO frequencies, the multi-LO-CS transform can be obtained.

In doing these measurements, several things should be taken into consideration. First, the zero input CS response has to be measured before the CS transform of a receiver can be measured. Secondly, the input signal should be within the dynamic range of the receiver; particularly the dynamic range of the LNA. The proposed CSR model is valid only within the dynamic range of the receiver. Thirdly, an appropriate normalization may be necessary because the power level within the active sub-band is not numerically equal to one.

The pre-selector is emulated by not generating any signal outside the frequency range of interest. The LNA is represented as a simple pass-through to the received signal. The down-conversion mixer, the anti-aliasing filter and the ADC are modeled in time domain using (5), (10) and (14)(14), respectively.

The first experiment shows the benefit of RS-MSS by using an example spectrum occupancy scenario. The second and third experiments use a probabilistic spectrum occupancy model to demonstrate the benefits of RS-MSS in a more general sense.

For the embodiments of the present invention, an example spectrum scenario was simulated, with a 96-MHz spectrum that is divided into 96, 1-MHz sub-bands. These sub-bands are sensed by the simulated receiver. The parameters of the simulated receiver are listed in Table V.

TABLE V

PARAMETERS OF SIMULATED
RECEIVER FOR EXPERIMENT A

| Parameter | Value |
|---|---|
| Noise floor | ~100 dBm per sub-band (referred to ADC output) |
| Pre-selector | Brick-walled 96 MHz bandwidth |
| LNA | Perfectly linear, unity gain |
| Down-conversion | Amplitude imbalance = 10% Phase imbalance = 3° (image rejection ratio = 25 dB) |
| Anti-aliasing filter | $5^{th}$ order Butterworth Cut-off frequency = 5.3 MHz |
| ADC | Sampling frequency = 16 MHz |
| DSP | Blackman window with 256 point FFT Number of periodograms = 32 |

The spectrum is set to contain two, 0.5 MSa/s BPSK signals with power levels of −60 dBm and −50 dBm at the $26^{th}$ and $44^{th}$ sub-bands, respectively. The BPSK signals use a root-raised cosine pulse shaping with roll of factor of 0.9.

First, S-MSS based spectrum sensing is carried out. The entire 96-MHz spectrum is measured by sensing one 16 MHz section at a time. Six non-overlapping 16 MHz sections were measured to sense the whole 96 MHz band.

Then, the CSR response of the simulated receiver is obtained using the mechanism that was described above. Finally, the output of S-MSS, and the measured CSR model of the simulated receiver are passed through the RS-MSS algorithm presented in Table 4. The output of the algorithm is compared with the output of S-MSS in FIG. 12.

Figure 12:
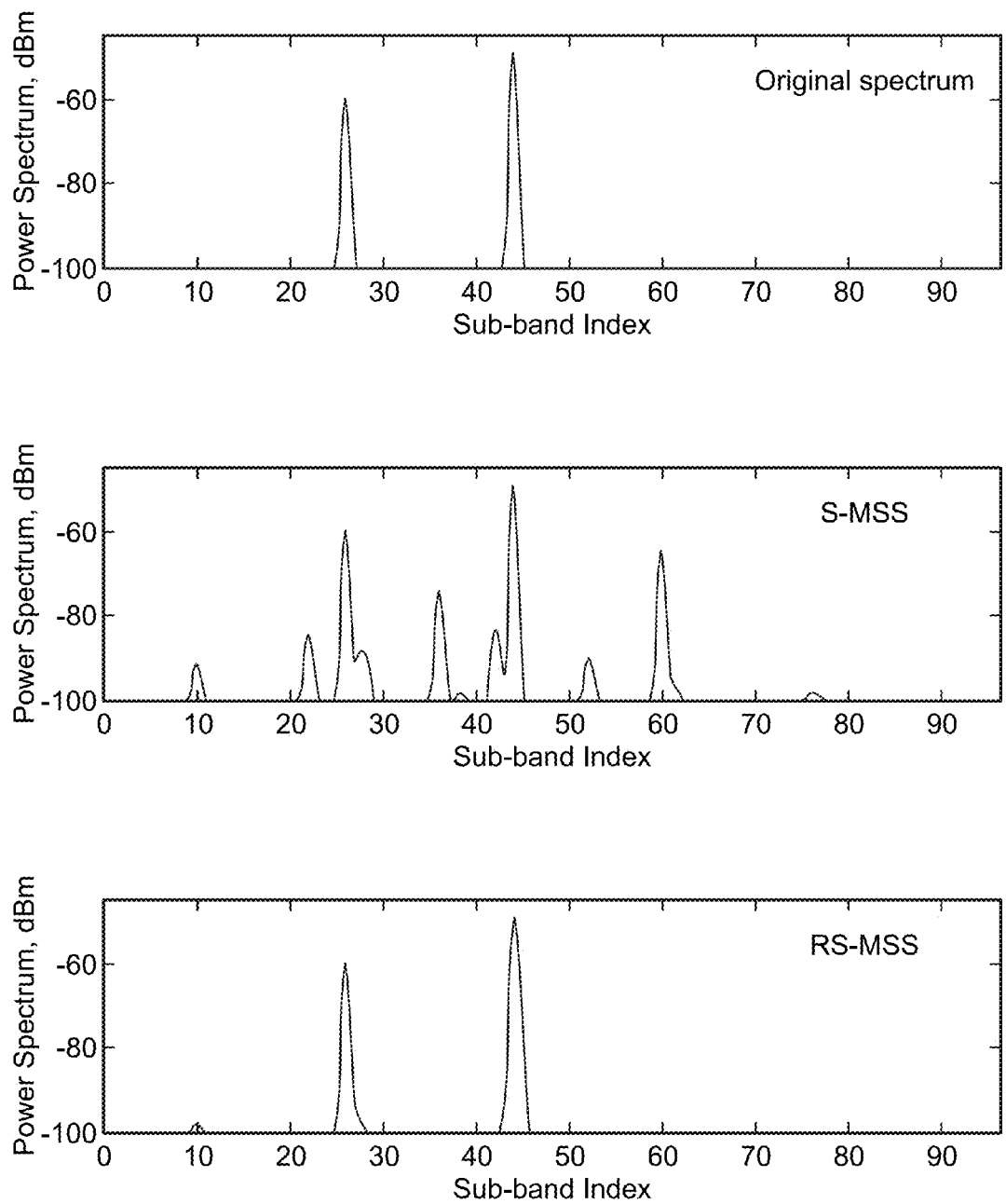
FIG. 12 is a comparison of RS-MSS and S-MSS.

The result in FIG. 12 demonstrates that RS-MSS can provide a more accurate spectrum sensing compared to S-MSS. This is because the proposed mechanism minimizes the impact of receiver impairments on spectrum sensing.

In addition, the result shows that I/Q imbalance and aliasing can cause overestimation of power levels in certain sub-bands. This implies that these impairments will have minimal effect on the primary user (PU) detection performance of a cognitive radio (CR). However, these impairments can significantly increase the false-alarm rate of a CR especially in dense spectrum scenarios.

The below experiment analyzes the benefits of RS-MSS in a more generalized sense. In this experiment, the spectrum is assumed to span 96 MHz, which is divided into 96, 1-MHz wide sub-bands.

The power level in the sub-bands is assumed to follow the distribution in spectrum occupancy model given by, $$F_p(p) = \begin{cases} 1, & p > p_{TX} \\ q_{oc}\left(1-\left(\frac{p_m}{p}\right)^{\frac{2}{n_{pl}}}\right)/\left(1-\left(\frac{p_m}{p_{TX}}\right)^{\frac{2}{n_{pl}}}\right), & p_m < p < p_{TX} \\ 1-q_{oc}, & p \le p_{TX} \end{cases} \quad (28)$$

where $p_m$ is the power of additive noise per sub-band referred to the ADC output, $p_{TX}$ is the transmission power, $n_{pl}$ is the path-loss exponent, and $q_{oc}$ is the probability of sub-band occupancy. This model is chosen because it captures the distribution of average received power in spectrum sharing based networks. In this experiment, we set the parameters as the followings: $p_m=-100$ dBm, $p_{TX}=23$ dBm, $n_{pl}=4$ and $q_{oc}=0.95$. The 3-dB cutoff frequency of the anti-aliasing filter is set to be equal to 5.3 MHz and sampling rate of ADC is equal to 16 MHz.

Figure 13:
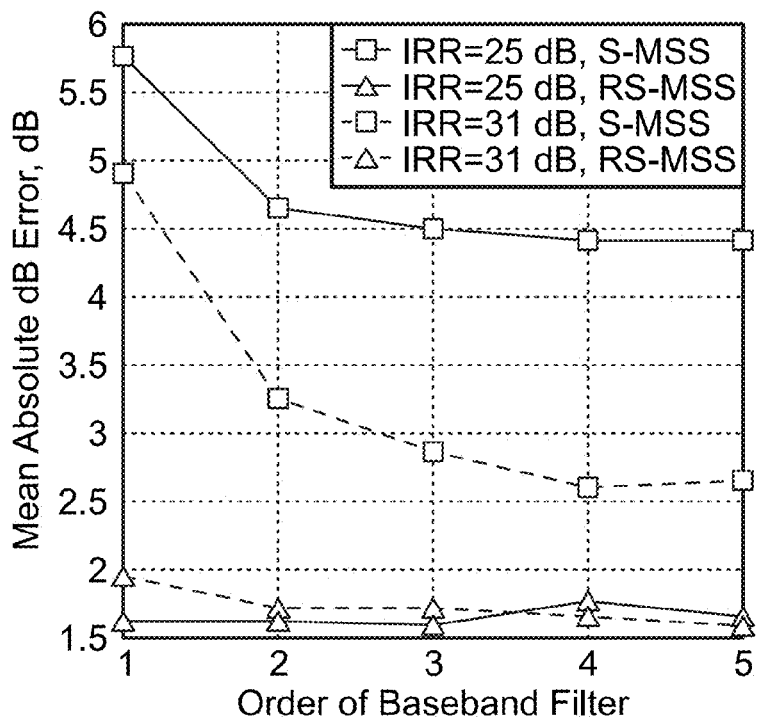
FIG. 13 is a comparison of RS-MSS and S-MSS accuracy.

The accuracy of S-MSS with RS-MSS while varying the order of the anti-aliasing filter and the image-rejection ratio (IRR) of the simulated receiver was also compared. Accuracy is calculated as the average absolute difference between the measured and the true sub-band powers in dB domain. The result is shown in FIG. 13, which shows that RS-MSS provides better spectrum sensing accuracy compared to S-MSS. It can also be observed that the accuracy S-MSS improves as IRR and the order of the anti-aliasing filter increases. This is because the effect of aliasing and image signals becomes less significant as the receiver becomes more selective.

On the contrary, the accuracy of RS-MSS shows little dependence on receiver parameters. This observation confirms that RS-MSS minimizes the impact of receiver impairments on spectrum sensing.

The opportunity detection performance of RS-MSS relative to density of spectrum occupancy was also analyzed. The spectrum is assumed to span 96 MHz, which is divided into 96, 1-MHz wide sub-bands.

The power content of all the sub-bands is generated using the distribution in (28)(28). The power level of the $44^{th}$ sub-band (the center sub-band) was purposely set to be equal to $p_m$ (the noise floor), and $p_m=-100$ dBm per sub-band. The simulation measures the opportunity detection performance by computing the probability that the measured power level at the $44^{th}$ sub-band (vacant sub-band) does not exceed the threshold, $p_m+3$ dB.

Figure 14:
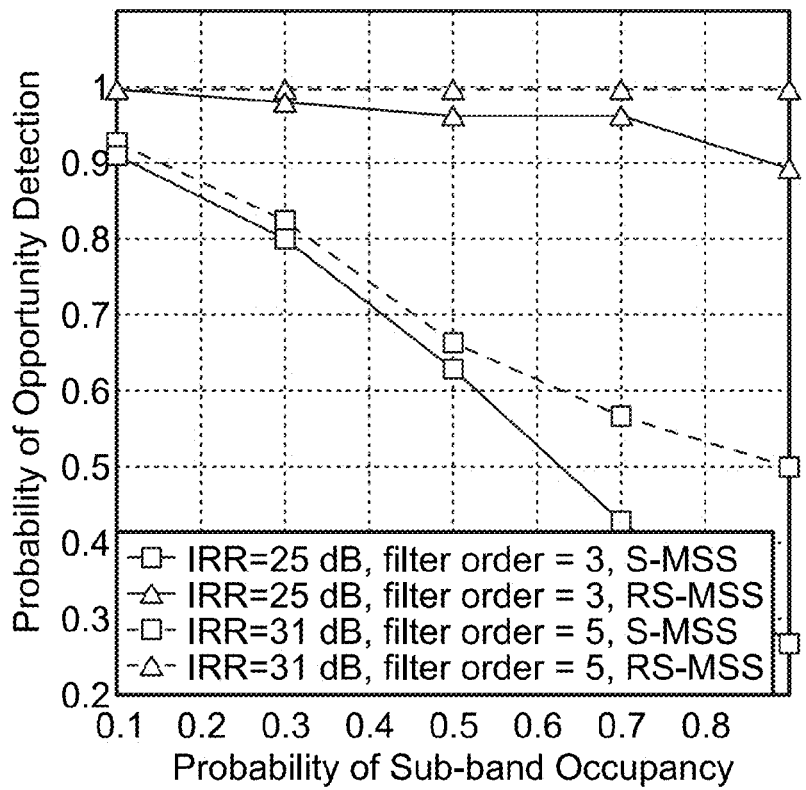
FIG. 14 illustrates opportunity detection probability while using RS-MSS and S-MSS.

Two types of receivers were simulated. The first receiver has IRR=31 dB and the order of its anti-aliasing filter is equal to 5. The second receiver has relatively inferior radio quality. It has IRR=25 dB and the order of its anti-aliasing filter is equal to 3. For both cases, the 3 dB cutoff frequency of the anti-aliasing filter is set to be equal to 5.3 MHz and sampling rate of ADC is equal to 16 MHz. The simulation is run by varying $q_{oc}$ between 0.1 and 0.9. The average opportunity detection probability obtained after 300 simulation runs is shown in FIG. 14.

For ideal receiver, the probability of opportunity detection is expected to remain constant as the density of spectrum occupancy increases because there is no signal folding from other bands to the vacant band. In non-ideal receivers employing S-MSS, however, the probability of opportunity detection is expected to deteriorate as the density of spectrum occupancy increases. This assertion is confirmed in FIG. 14. According to the result, the probability of opportunity detection in S-MSS based CR has strong dependence on the density of spectrum occupancy. In addition, the probability of opportunity detection was shown to be lower for a lower quality sensing receiver.

The probability of opportunity detection is shown to be significantly better when RS-MSS is employed. In addition, similar to an ideal receiver, the probability of opportunity detection shows little dependence on both the density of spectrum occupancy and the quality of the receiver. This indicates that RS-MSS-based CR can exhibit significantly better throughput in spectrum sharing network compared to a S-MSS-based CR. In addition, the result imply that RS-MSS-based CR can behave similar to a high quality receiver even if it has poor radio quality.

The CSR domain receiver modeling technique and the proposed RS-MSS mechanism was also carried out on a hardware-based experiment to validate both. Wireless @ Virginia Tech's PicoRF software defined radio platform was used. The platform contains highly flexible CMOS RFIC, a Virtex-5 FPGA and a host computer. The FPGA is interfaced with the host computer through a PCIe interface.

Figure 15:
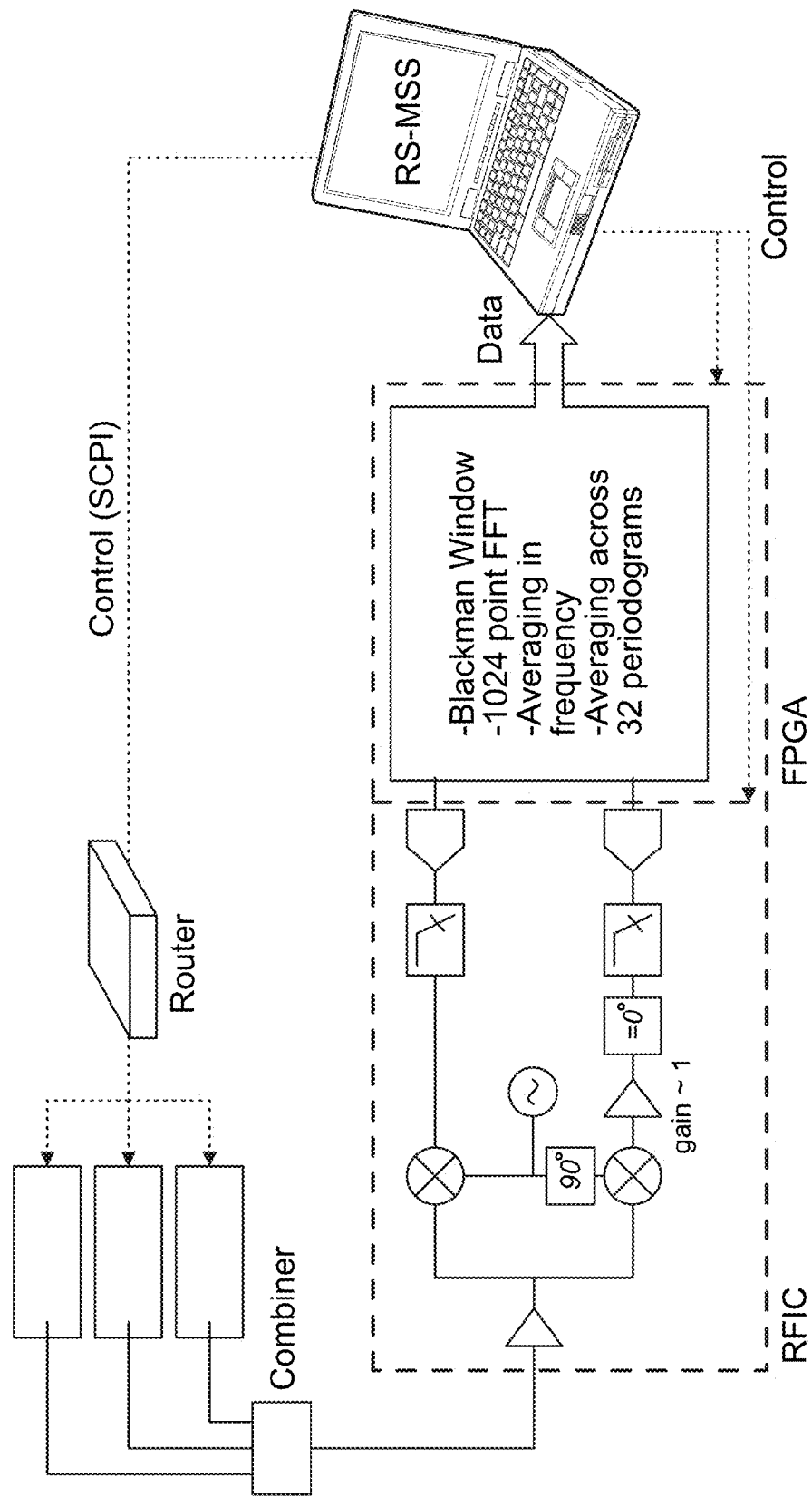
FIG. 15 illustrates another embodiment of the present invention.

The diagram of the setup is shown in FIG. 15 and contains the PicoRF platform and three signal generators. The output of the signal generators are input to the receiver through a combiner. A periodogram-based spectrum measurement is implemented in the FPGA. The measurement uses a 1024 point FFT with Blackman window. In addition, time-domain averaging is carried out across 32 periodograms. The output of spectrum measurement in the FPGA is sent to the host computer through the PCIe interface. The RS-MSS mechanism and the CSR model measurement mechanism are both implemented in the host computer.

The image rejection ratio of the PicoRF receiver varies with frequency, but can be as low as 20 dB. The anti-aliasing filter in the receiver is a $5^{th}$ order Butterworth type active filter. Over-sampling sigma-delta ADC is employed in the receiver. Aliasing of signals and noise is caused mainly due to finite rejection of the decimation filters.

The bandwidth of a sub-bands equals to 1.953125 MHz and, arbitrarily, sense the spectrum from 840 MHz to 888 MHz which is equivalent to 24 sub-bands was selected. The sampling rate is equal to 15.625 MHz. This means, there are 8 sub-bands in the first Nyquist zone. Because the CSR measurement in the FPGA used 1024 point FFT, 128 FFT samples fall within each of the 8 sub-bands. According to (22)(22), this oversampling rate is sufficient to reject the power leakage between adjacent sub-bands.

The host computer uses Standard Commands for Programmable Interface (SCPI) over a local-area network to control the frequencies and power levels of the signal generators' RF output. The multi-LO-CS transform and the multi-LO-zero-input-CS response of the receiver were measured. During this measurement, the host computer commands the signal generators such that the desired CSR is input to the receiver.

Figure 16:
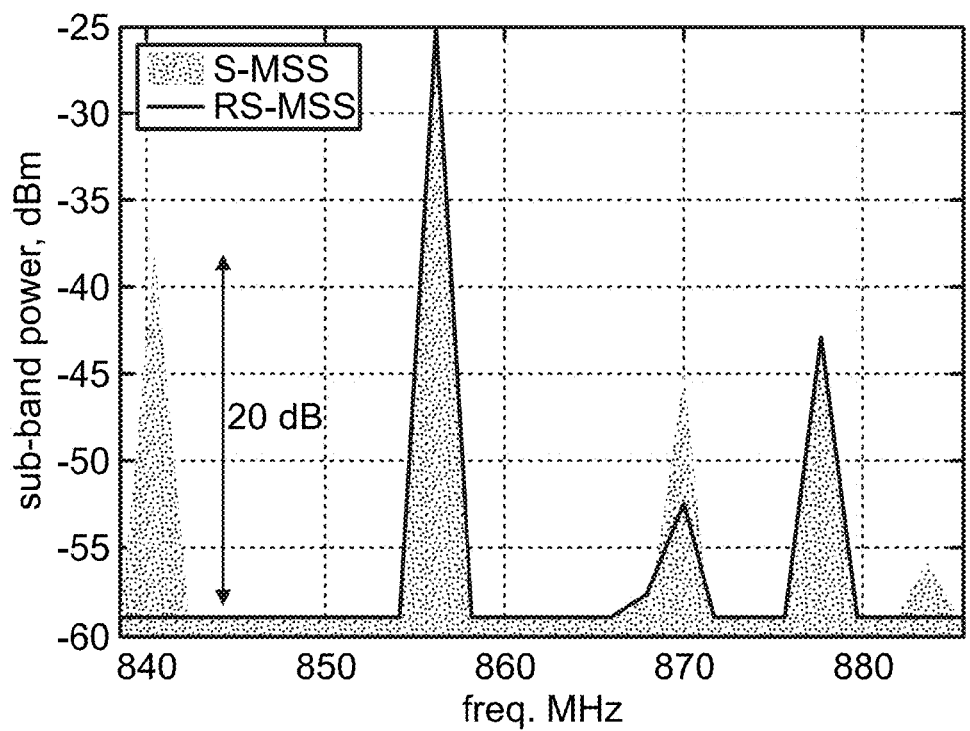
FIG. 16 compares S-MSS with RS-MSS while measuring a spectrum containing a −25 dBm signal at 856 MHz and −45 dBm signal at 878 MHz.
Figure 17:
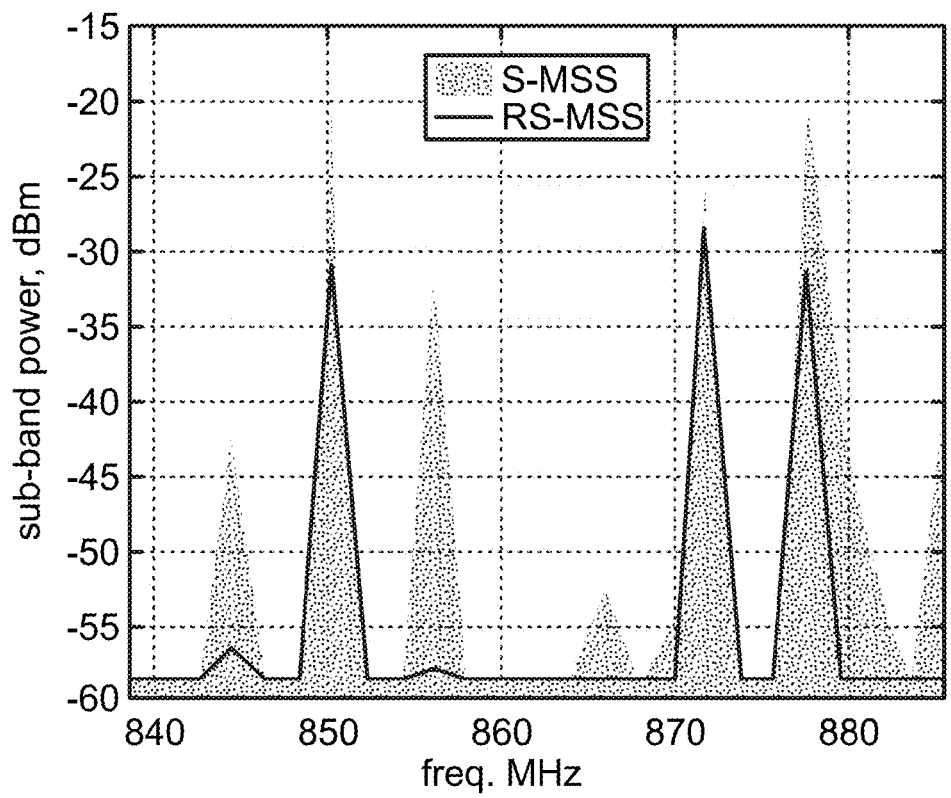
FIG. 17 compares S-MSS with RS-MSS while measuring a spectrum containing three signals at 850 MHz, 871 MHz and 878 MHz, each with power of −30 dBm.

FIG. 16 compares the output of S-MSS and RS-MSS while two signals with power level −25 dBm and −45 dBm are input to the receiver at 856 MHz and 878 MHz, respectively. The results show RS-MSS providing improvements of more 20 dB at the first sub-band. Similarly, FIG. 17 compares S-MSS and RS-MSS when three −30 dBm signals are input to the receiver at 850 MHz, 871 MHz and 878 MHz. The result shows that RS-MSS provides significantly more accurate measurement compared to S-MSS.

The results in FIG. 16 and FIG. 17 confirm the benefits of RS-MSS over S-MSS. The fact that the overall system is functional on hardware also confirms the practical validity of the CSR domain receiver modeling technique.

Accurate spectrum sensing boosts the likelihood that cognitive radios detect a spectrum opportunity under spectrum sharing scenarios. I/Q imbalance and aliasing can degrade the performance of cognitive radios by significantly increasing the rate of false-alarm during spectrum sensing. As a solution, the present invention provides embodiments deploying a multi-band spectrum sensing mechanism called robust serial-multiband spectrum sensing (RS-MSS). This mechanism can address the effects of I/Q imbalance and aliasing in multi-band spectrum sensing. RS-MSS estimates the true state of the spectrum at the receiver input by removing the effects of receiver imperfections from the spectrum sensing data measured at the output of analog-to-digital converters (ADC). To achieve this, RS-MSS uses a new receiver modeling technique called channelized spectrum representation (CSR). This model tracks how energy is reshuffled inside the receiver due to I/Q imbalance and aliasing. RS-MSS estimates the state of the spectrum at the receiver input by applying the ADC output to the reverse CSR model of the receiver.

A simulation-based evaluation showed that the proposed sensing mechanism significantly improves the opportunity detection performance of cognitive radios by minimizing the rate of false alarm in spectrum sensing. In other words, RS-MSS can enhance the throughput of cognitive radios in spectrum sharing based networks.

Csr Model of Quadrature Mixer

The relation in (5), can be expressed in frequency domain as;

$$V(f) = \{W(f+l\Delta) + \gamma W(f+l\Delta)\} \cdot (1 + (1+\alpha)e^{j\phi}) \tag{29}$$

where $V(f) = \Im\{v(t)\}$ and $w(f) = \Im\{w(t)\}$. The term $\gamma$ is given by, $$\gamma = \frac{1 - (1+\alpha)e^{j\phi}}{1 + (1+\alpha)e^{j\phi}} \tag{30}$$

Let, $$\tilde{V}_i(f) = V(f)\Pi\left(\frac{f - i\Delta + \Delta/2}{\Delta}\right) \tag{31}$$

$$\tilde{W}_i(f) = W(f)\Pi\left(\frac{f - i\Delta + \Delta/2}{\Delta}\right) \tag{32}$$

where i= . . . , −2, −1, 0, 1, 2, . . . . Then, dropping the common multiplier in (29), and substituting (29) in (31), we have, $$\tilde{V}_i(f) = W(f + \Delta l)\Pi\left(\frac{f - i\Delta + \Delta/2}{\Delta}\right) + \qquad (33)$$
$$\gamma W(f - \Delta l)\Pi\left(\frac{f - i\Delta + \Delta/2}{\Delta}\right)$$

Noting that, $\tilde{W}_{k+i}(f) = \tilde{W}_i(f+k\Delta)$, it can be shown that, $$\tilde{V}_i(f) = \tilde{W}_{l+i}(f) + \gamma \tilde{W}_{-l+i}(f) \qquad (34)$$

This can be written in time domain as, $$\tilde{v}_i(t) = \tilde{w}_{l+i}(t) + \gamma \tilde{w}_{-l+i}(t) \qquad (35)$$

Assuming $\tilde{w}_{l+i}(t)$ and $\tilde{w}_{-l+i}(t)$ are statistically uncorrelated, then, it can be shown that, $$E(|\tilde{v}_i(t)|^2) = E(|\tilde{w}_{l+i}(t)|^2) + |\gamma|^2 E(|\tilde{w}_{-l+i}(t)|^2) \qquad (36)$$

Since w(t) is real valued, it can be noted that $E(|\tilde{w}_{-l+i}(t)|^2) = E(|\tilde{w}_{l+i}(t)|^2)$. And, using (3) and (7), $$p_v[i] = p_w[l+i] + \beta p_w[l-i] \qquad (37)$$

Csr Model of ADC

The relation in (14) can be expressed in the analog frequency domain as;

$$D(f) = (s\Delta)^2 \sum_{k=-\infty}^{\infty} Z(f - s\Delta k) \qquad (38)$$

where $D(f) = \Im\{d(t)\}$ and $z(f) = \Im\{z(t)\}$.
Let, $$\tilde{D}_i(f) = D(f)\Pi\left(\frac{f - i\Delta + \Delta/2}{\Delta}\right) \qquad (39)$$

$$\tilde{Z}_i(f) = Z(f)\Pi\left(\frac{f - i\Delta + \Delta/2}{\Delta}\right) \qquad (40)$$

Substituting (38) into (39), and noting that $\tilde{Z}_{-sk+i}(f) = \tilde{Z}_i(f-s\Delta k)$, it can be shown that, $$\tilde{d}_i(t) = (s\Delta)^2 \sum_{k=-\infty}^{\infty} \tilde{z}_{i-sk}(f) \qquad (41)$$

Assuming signals in different sub-bands are uncorrelated to each other, and substituting (41) into (3), it can be shown that, $$p_d[i] = (s\Delta)^2 \sum_{k=-\infty}^{\infty} p_z[i - ks] \qquad (42)$$

Distribution of Csr Measurement Error

Let the signal contained in a sub-band at the output of the ADC be given by, $$s_n = r_{i,n} + jr_{q,n} \qquad (43)$$

where $r_{i,n}$ and $r_{q,n}$ are the real and imaginary components obtained in the $n^{th}$ periodogram, respectively. Assume they are uncorrelated to each other. Assume $E[r_{i,n}] = 0$ and $E[r_{i,n}^2] = p_t/2$. Similarly, $E[r_{q,n}] = 0$ and $E[r_{q,n}^2] = p_t/2$. In addition, assume the higher order moments of $r_{i,n}$ and $r_{q,n}$ are equal to zero. In addition, note that $E[|s|^2] = p_t$.

The objective of CSR measurement is to estimate for $\hat{p}_t$ given by, $$\hat{p}_t = \frac{1}{N_p} \sum_{i=1}^{N_p} |s_n|^2 \qquad (44)$$

It can be shown that $E[\hat{p}_t] = p_t$ and $VAR[\hat{p}_t] = p_t^2/(2N_p)$, where VAR is variance operator. Since $|s_n|$ has finite first and second order moments, the central-limit theorem applies. Hence, we can approximate the distribution of $\hat{p}_t$ by the normal distribution. Therefore, the measurement error (residue) given by $e = p_t - \hat{p}_t$ is also normally distributed with zero mean and variance equal to $p_t^2/(2N_p)$.

In yet other embodiments, the present invention provides a signal detection method comprising the steps of providing a RF front-end configured to have at least one flexible main radio path. The at least one flexible main radio path may have a plurality of configurable parameters, and at least one sensing radio path. The flexible main radio path is tuned to a desired frequency band. The sensing path monitors a spectrum around the desired frequency band to create spectrum sensing data. The spectrum sensing data may be provided to a cognitive engine that is configured to determine the optimal values of the configuration parameters in terms of minimizing the distortion of a desired signal at the output of the flexible main radio path.

In yet other embodiments, the present invention provides a spectrum sensing module that is configured to provide the spectrum sensing data in real-time to the cognitive engine. A main path controller may also be provided for the main radio path which adjusts the configuration parameters of the RF front-end based on the decisions of the cognitive engine. The configuration parameters may include voltage bias, current bias, local oscillator frequency, sampling frequency, filter selectivity, and gain. The sensing path may also be configured to have a lower gain setting to minimize effects of undesired non-linearity on spectrum state measurement.

In other embodiments, the method of the present invention provides a self-calibration module to measure the characteristics of the main radio path and the sensing path at all possible configurations. A self-calibration module maybe used to report the characteristics of the main radio path and sensing path to the cognitive engine and the spectrum-sensing module. The cognitive engine and the main path controller may adjust a sampling frequency of the main path to minimize distortions on a desired signal. The cognitive engine may also adjust a local oscillator frequency, a voltage bias of said RF front-end, a gain of said RF front-end and/or the selectivity of said RF front-end to minimize distortions on a desired signal.

In other embodiments, the cognitive engine eliminates strong filtering at the input of the main path by shifting it away from images and aliases of undesired signals. The cognitive engine may also include a wideband spectrum-sensing algorithm.

In other embodiments the methods of present invention use reversed versions of the sensing path characteristics which are measured by the self-calibration module and used to remove the effects of RF front-end imperfections from raw spectrum sensing data.

A receiver mechanism may also be used to reconstruct the desired signal after it is distorted by strong adjacent channel signals in the RF front-end. The method may further include using a low-gain alternative RF path to measure the strongest signal in the spectrum of the sensing path to estimate the compression on the desired signal in real-time. Spectrum sensing may also be framed as an estimation problem that estimates the actual power level in each channel in the spectrum by channelizing it into equal bandwidth sub-bands where only one sub-band at a time is sensed by stepping through the bandwidth sub-bands by changing the local oscillation frequency.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A signal detection method comprising the steps of:
providing a RF front-end configured to have at least one flexible main radio path, said at least one flexible main radio path having a plurality of configurable parameters, and at least one sensing radio path;
said flexible main radio path is tuned to a desired frequency band;
said sensing path monitors a spectrum around said desired frequency band to create spectrum sensing data; and
providing said spectrum sensing data to a cognitive engine configured to determine the optimal values of said configuration parameters in terms of minimizing the distortion of a desired signal at the output of said flexible main radio path.

2. The method of claim 1 further comprising the step of providing a spectrum sensing module configured to provide said spectrum sensing data in real-time to said cognitive engine.

3. The method of claim 1 further comprising the step of providing a main path controller for said main radio path, said controller adjusts the configuration parameters of the RF front-end based on the decisions of the cognitive engine.

4. The method of claim 3 wherein said configuration parameters include voltage bias, current bias, local oscillator frequency, sampling frequency, filter selectivity, and gain.

5. The method of claim 1 further comprising the step configuring said sensing path to have a lower gain setting to minimize effects of undesired non-linearity on spectrum state measurement.

6. The method of claim 1 of providing a self-calibration module to measure the characteristics of said main radio path and the sensing path at all possible configurations.

7. The method of claim 2 wherein said self-calibration module reports the characteristics of said main radio path and sensing path to said cognitive engine and said spectrum-sensing module.

8. The method of claim 3 wherein said cognitive engine and said main path controller adjust a sampling frequency of said main path.

9. The method of claim 3 wherein said cognitive engine and said main path controller adjust a sampling frequency of said main path to minimize distortions on a desired signal.

10. The method of claim 1 wherein said cognitive engine adjusts a local oscillator frequency to minimize distortions on a desired signal.

11. The method of claim 1 wherein said cognitive engine adjusts a voltage bias of said RF front-end to minimize distortions on a desired signal.

12. The method of claim 1 wherein said cognitive engine adjusts a gain of said RF front-end to minimize distortions on a desired signal.

13. The method of claim 1 wherein said cognitive engine adjusts the selectivity of said RF front-end to minimize distortions on a desired signal.

14. The method of claim 1 wherein said cognitive engine eliminates strong filtering at the input of said main path by shifting it away from images and aliases of undesired signals.

15. The method of claim 1 further including a wideband spectrum-sensing algorithm.

16. The method of claim 6 wherein reversed versions of said sensing path characteristics are measured by said self-calibration module and used to remove the effects of RF front-end imperfections from raw spectrum sensing data.

17. The method of claim 1 further including a receiver mechanism that reconstructs said desired signal after it is distorted by strong adjacent channel signals in the RF front-end.

18. The method of claim 17 further including a low-gain alternative RF path to measure the strongest signal in said spectrum of said sensing path to estimate the compression on the desired signal in real-time.

19. The method of claim 1 wherein said spectrum sensing is framed as an estimation problem that estimates the actual power level in each channel in said spectrum by channelizing it into equal bandwidth sub-bands.

20. The method of claim 19 wherein said spectrum sensing is performed by sensing only one sub-band at a time by stepping through said bandwidth sub-bands by changing the local oscillation frequency.

* * * * *